(12) United States Patent
Hioki et al.

(10) Patent No.: US 12,320,781 B2
(45) Date of Patent: Jun. 3, 2025

(54) JOINED BODY TESTING METHOD, JOINED BODY TESTING DEVICE, AND JOINED BODY

(71) Applicants: Kobe Steel, Ltd., Kobe (JP); SHIMADZU CORPORATION, Kyoto (JP)

(72) Inventors: Ryusuke Hioki, Kanagawa (JP); Yoshihaya Imamura, Kanagawa (JP); Chieko Imai, Kanagawa (JP); Takahide Hatahori, Kyoto (JP); Koki Yoshida, Kyoto (JP)

(73) Assignees: Kobe Steel, Ltd., Kobe (JP); SHIMADZU CORPORATION, Kyoto (JP)

( * ) Notice: Subject to any disclaimer, the term of this patent is extended or adjusted under 35 U.S.C. 154(b) by 338 days.

(21) Appl. No.: 18/040,581

(22) PCT Filed: Jun. 30, 2021

(86) PCT No.: PCT/JP2021/024720
§ 371 (c)(1),
(2) Date: Feb. 3, 2023

(87) PCT Pub. No.: WO2022/030149
PCT Pub. Date: Feb. 10, 2022

(65) Prior Publication Data
US 2023/0266275 A1    Aug. 24, 2023

(30) Foreign Application Priority Data

Aug. 5, 2020  (JP) .................................. 2020-133198

(51) Int. Cl.
*G01N 29/24* (2006.01)
*G01N 29/04* (2006.01)

(52) U.S. Cl.
CPC ....... *G01N 29/2418* (2013.01); *G01N 29/041* (2013.01); *G01N 2291/0234* (2013.01);
(Continued)

(58) Field of Classification Search
None
See application file for complete search history.

(56) References Cited

U.S. PATENT DOCUMENTS 4,172,382 A * 10/1979 Murphy .................... G01V 1/16
73/40.5 A
11,181,510 B2 * 11/2021 Hatahori ................ G01N 29/04
(Continued)

FOREIGN PATENT DOCUMENTS

JP    2017-131959 A    8/2017
JP    2019-13955 A     1/2019

OTHER PUBLICATIONS

International Search Report mailed on Sep. 21, 2021 in PCT/JP2021/024720 filed on Jun. 30, 2021.

*Primary Examiner* — Suman K Nath
(74) *Attorney, Agent, or Firm* — Oblon, McClelland, Maier & Neustadt, L.L.P.

(57) ABSTRACT

A testing method for a joined body, in which a second pipe member having an outer diameter smaller than that of a first pipe member having at least one through hole is inserted into the first pipe member and the second pipe member is expanded to form a joining portion, the testing method includes: applying an elastic wave vibration to the joined body of the first pipe member and the second pipe member, for plural visual field regions at different positions in a circumferential direction of the joined body, acquiring a vibration distribution of the second pipe member measured through the through hole and a vibration distribution of the first pipe member in a visual field region including the joining portion of the first pipe member and the second pipe (Continued)

member, which are measured optically and in a batch, and determining quality of joining in the entire joining portion based on the acquired vibration distributions.

16 Claims, 12 Drawing Sheets

(52) U.S. Cl.
CPC ............... *G01N 2291/0289* (2013.01); *G01N 2291/0422* (2013.01)

(56) References Cited

U.S. PATENT DOCUMENTS

| | | | |
|---|---|---|---|
| 2014/0283610 A1* | 9/2014 | Morioka | G01N 29/46 73/588 |
| 2021/0148492 A1 | 5/2021 | Imamura et al. | |

* cited by examiner

JOINED BODY TESTING METHOD, JOINED BODY TESTING DEVICE, AND JOINED BODY

TECHNICAL FIELD

The present invention relates to a testing method for a joined body, a testing device for a joined body, and a joined body.

BACKGROUND ART

In components of an automobile and the like, a joined body in which a metal pipe member is joined to another member (member to be joined) is used. Patent Literature 1 describes that a pipe member is inserted into a hole provided in a member to be joined, and the pipe member is increased in diameter to be pressed against the member to be joined, thereby joining the pipe member to the member to be joined. In this literature, in order to increase the pipe member in diameter, a method is adopted in which a coil is inserted into the pipe member so as to be aligned with a position of the hole of the member to be joined, and a pulsed large current is instantaneously caused to flow through the coil. Accordingly, a magnetic field is generated from the coil, an eddy current is generated in the pipe member by the magnetic field, and the pipe member is increased in diameter by the Lorentz force acting between the coil and the pipe member. This method can be suitably used for a pipe member made of a highly conductive material such as aluminum. In addition, as a mechanical technique having a similar joining state, there are a technique in which an expansion and contraction mechanism is inserted into a pipe member to increase the pipe member in diameter, a technique in which an elastic body such as rubber is provided inside a pipe member to increase the pipe member in diameter by elastic deformation, a technique in which a high pressure is applied by introducing a non-compressible fluid into a pipe member, and the like, although the productivity is inferior to that of the above technique. In addition, Patent Literature 2 describes a technique of swaging and joining pipe members to each other by electromagnetic molding.

CITATION LIST

Patent Literature

Patent Literature 1: JP2017-131959A
Patent Literature 2: JP2019-13955A SUMMARY OF INVENTION

Technical Problem

Examples of a method for testing whether a pipe member and a member to be joined are joined to each other with sufficient strength after the pipe member and the member to be joined are joined to each other as described above include an X-ray CT testing method. Unfortunately, it is difficult to detect a gap narrower than 1 μm in X-ray CT examination having a sufficiently wide visual field applicable to test on such a joined body. In addition, it is not possible to evaluate a swaging state such as whether a swaging portion of a joining portion of the pipe member is reliably swaged. Presence or absence of such a narrow gap or the swaging state may be an important problem in terms of strength in, for example, components of an automobile and the like, and thus it is required to establish a testing method with high defect detection accuracy.

Therefore, an object of the present invention is to provide a testing method for a joined body and a testing device for a joined body capable of accurately detecting a joining failure due to a minute gap between members of a joined body or insufficient swaging, and a joined body used for testing.

Solution to Problem

The present invention includes the following configurations.

(1) A testing method for a joined body, in which a second pipe member having an outer diameter smaller than that of a first pipe member having at least one through hole is inserted into the first pipe member and the second pipe member is expanded to form a joining portion, the testing method including:

applying an elastic wave vibration to the joined body of the first pipe member and the second pipe member, for a plurality of visual field regions at different positions in a circumferential direction of the joined body, acquiring a vibration distribution of the second pipe member measured through the through hole and a vibration distribution of the first pipe member in a visual field region including the joining portion of the first pipe member and the second pipe member, which are measured optically and in a batch, and determining quality of joining in the entire joining portion based on the acquired vibration distributions.

(2) A testing device for a joined body, in which a second pipe member having an outer diameter smaller than that of a first pipe member is overlapped and joined in the first pipe member, the testing device including:

a vibration applying unit configured to apply an elastic wave vibration to the joined body, and a vibration detection unit configured to acquire, for a plurality of visual field regions at different positions in a circumferential direction of the joined body, a vibration distribution of an exposed portion of the second pipe member measured through a through hole formed in the first pipe member and a vibration distribution of the first pipe member in a visual field region including a joining portion of the first pipe member and the second pipe member, which are measured optically and in a batch.

(3) A joined body including a joining portion in which an inner circumferential surface of the first pipe member and an outer circumferential surface of the second pipe member are in close contact with each other in a state in which at least a part of a second pipe member having an outer diameter smaller than that of a first pipe member is inserted into the first pipe member and the first pipe member and the second pipe member are expanded, in which at least one through hole is formed in the joining portion of the first pipe member, and the joining portion of the second pipe member is in contact with the first pipe member without being engaged with an inner edge of the through hole.

Advantageous Effects of Invention

According to the present invention, it is possible to reliably detect a joining failure due to a minute gap between a pipe member and a member to be joined or insufficient swaging.

DESCRIPTION OF EMBODIMENTS

Hereinafter, an embodiment of the present invention will be described in detail with reference to the drawings.
<Configuration of Testing Device>

Figure 1:
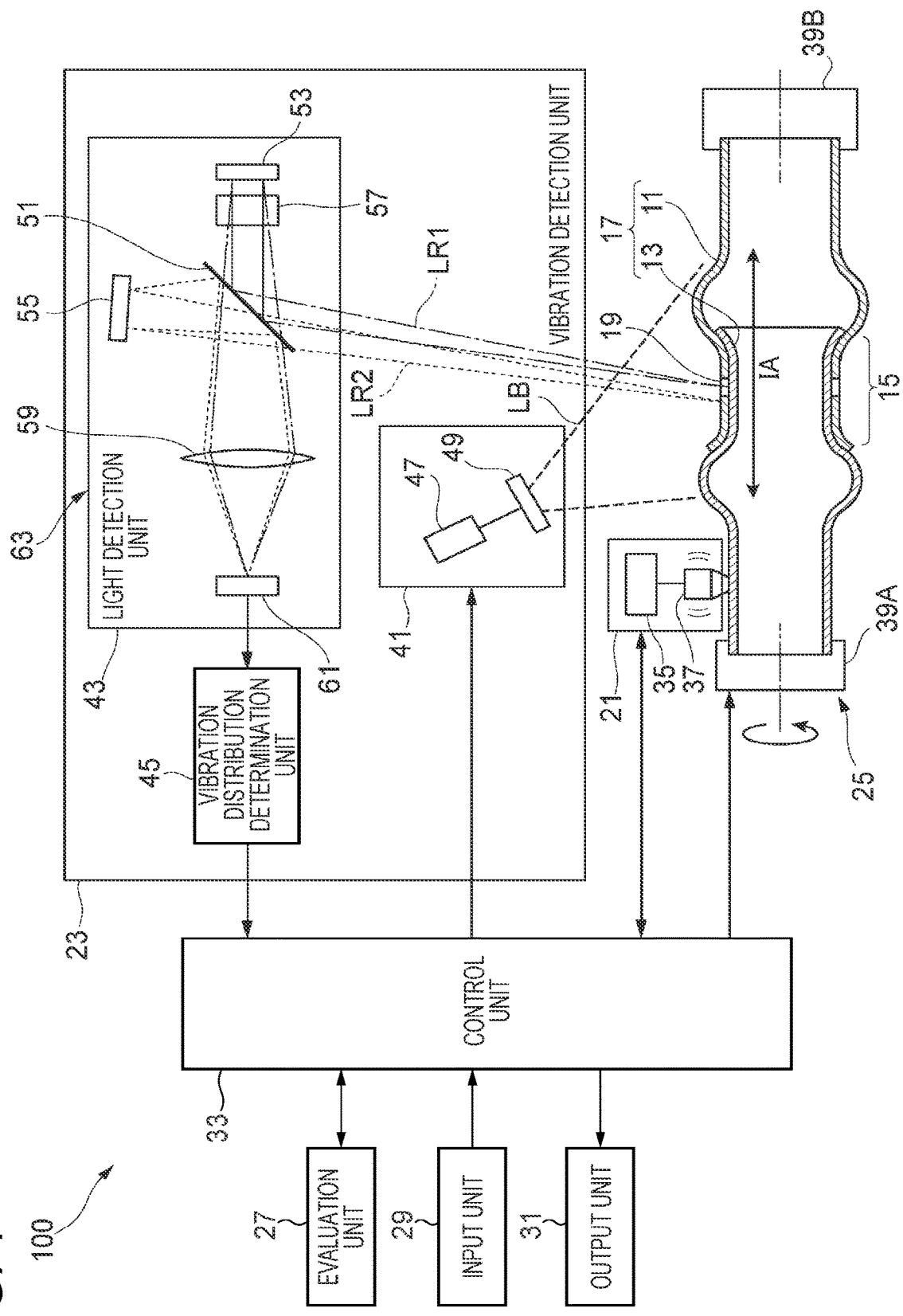
FIG. 1 is a schematic configuration diagram showing an embodiment of a testing device for a joined body according to the present invention.

FIG. 1 is a schematic configuration diagram showing an embodiment of a testing device for a joined body according to the present invention.

A testing device for a joined body (hereinafter, referred to as a "testing device") 100 tests, using elastic wave vibration, a degree of close contact of a joined body 17 in which a first pipe member 11 and a second pipe member 13 are joined in close contact with each other at a joining portion 15. The quality of a joining strength of the joined body 17 can be determined according to the degree of close contact. In the joined body 17 of this configuration, a through hole 19 is formed in the first pipe member 11 at the joining portion 15, and the second pipe member 13 is exposed from the through hole 19, such that an elastic wave vibration to be described later can be detected.

The testing device 100 includes a vibration applying unit 21, a vibration detection unit 23, a relative movement mechanism 25, an evaluation unit 27, an input unit 29, an output unit 31, and a control unit 33 that controls these units.

The vibration applying unit 21 includes a signal generator 35 and a vibrator 37, and applies an elastic wave vibration to the joined body 17. The signal generator 35 is electrically connected to the vibrator 37 through a cable, and transmits a generated AC electric signal to the vibrator 37. The vibrator 37 is used in contact with the joined body 17, converts the AC electric signal received from the signal generator 35 into an elastic wave vibration, which is a mechanical vibration, and applies the elastic wave vibration to the joined body 17.

A contact position of the vibrator 37 with the joined body 17 may be either the first pipe member 11 or the second pipe member 13 constituting the joined body 17, and may be a position that does not include a visual field region IA to be described later, such as a portion separated from the joining portion 15 of the second pipe member 13 in an axial direction. A shape of the vibrator 37 is not particularly limited, but in order to facilitate contact with the second pipe member 13 (or the first pipe member 11) whose surface is formed as a curved surface, a tip end is preferably pointed so as to reduce a contact area.

The vibration detection unit 23 includes a light irradiation unit 41, a light detection unit 43, and a vibration distribution determination unit 45, and detects, optically and in a batch, a distribution of a vibration state (amplitude and/or phase) (hereinafter, referred to as a vibration distribution) at least in an exposed portion of the second pipe member 13 exposed from the through hole 19.

The light irradiation unit 41 includes a laser light source 47 and a beam shaping lens 49. The laser light source 47 emits a pulsed laser light (pulse laser light LB) at a timing synchronized with the AC electric signal generated by the signal generator 35 of the vibration applying unit 21. The beam shaping lens 49 is formed of a concave lens arranged between the laser light source 47 and the joined body 17.

The laser light source 47 may be directly cable-connected to the signal generator 35 in addition to being connected to the signal generator 35 of the vibration applying unit 21 via the control unit 33. In this case, synchronization control with the AC electric signal can be performed with high accuracy. The beam shaping lens 49 has a role of expanding an irradiation region of the pulse laser light LB such that the pulse laser light LB from the laser light source 47 is irradiated to a range including at least the through hole 19 of the joining portion 15 in the joined body 17. Here, the entire range irradiated with the pulse laser light or a portion including the through hole 19 of the joining portion 15 in the irradiation range is defined as the visual field region IA for detecting the vibration distribution.

The light detection unit 43 detects an interference pattern formed by interference between a reflected light obtained by reflecting the pulse laser light LB in the visual field region IA and a reference light to be described in detail later.

The light detection unit 43 is a so-called speckle sharing interferometer 63 including a beam splitter 51, a first reflecting mirror 53, a second reflecting mirror 55, a phase shifter 57, a condensing lens 59, and an image sensor 61.

The beam splitter 51 is a half mirror arranged at a position where the reflected light reflected by a surface of the joined body 17 is incident at each point in the visual field region IA.

The first reflecting mirror 53 is arranged on an optical path of a first reflected light LR1 in which the reflected light from the surface of the joined body 17 is reflected by the beam splitter 51, and the second reflecting mirror 55 is arranged on an optical path of a second reflected light LR2 in which the reflected light from the surface of the joined body 17 is transmitted through the beam splitter 51.

The phase shifter 57 is arranged between the beam splitter 51 and the first reflecting mirror 53, and changes (shifts) the phase of the reflected light passing through the phase shifter 57.

The image sensor 61 is arranged on an optical path of the first reflected light LR1, which is reflected by the first reflecting mirror 53 and passes through the beam splitter 51 after the reflected light from the surface of the joined body 17 is reflected by the beam splitter 51, and the second reflected light LR2, which is reflected by the second reflecting mirror 55 and reflected by the beam splitter 51 after the reflected light from the surface of the joined body 17 passes through the beam splitter 51.

The condensing lens 59 is arranged between the beam splitter 51 and the image sensor 61.

The first reflecting mirror 53 is arranged such that a reflecting surface thereof forms an angle of 45 degrees with respect to a reflecting surface of the beam splitter 51. On the other hand, the second reflecting mirror 55 is arranged such that a reflecting surface thereof forms an angle slightly inclined from 45 degrees with respect to the reflecting surface of the beam splitter 51.

The image sensor 61 includes a large number of detection elements, and detects, by different detection elements, reflected light incident on the image sensor 61 through the first reflecting mirror 53 and the phase shifter 57 and reflected light incident on the image sensor 61 through the second reflecting mirror 55, from a large number of points on the surface of the joined body 17 in the visual field region IA. Each detection element outputs an electric signal corresponding to an intensity of the detected light.

The vibration distribution determination unit 45 obtains a vibration distribution in the visual field region IA by a procedure to be described in detail later in accordance with the electric signal representing the interference pattern detected by the light detection unit 43.

The relative movement mechanism 25 is a device that rotates the first pipe member 11 and the second pipe member 13 of the joined body 17 around axes thereof, and includes a pair of gripping portions 39A and 39B that grip end portions of the joined body 17, and a motor (not shown) that rotationally drives at least the gripping portion 39A. The relative movement mechanism 25 can change a rotational position of the joined body 17 such that the through hole 19 of the joining portion 15 of the joined body 17 gripped by the gripping portions 39A and 39B is arranged in the visual field region IA. An operator may manually move the joined body 17 without using the relative movement mechanism 25 such that a desired position is included in the visual field region IA.

The evaluation unit 27 determines the quality of a joining state of the joining portion 15 as described later based on the vibration distribution of the visual field region IA determined by the vibration distribution determination unit 45, that is, acquired by the vibration detection unit 23.

In addition, the testing device 100 includes an input unit 29 through which the operator inputs information to the testing device 100, and an output unit 31 such as a display that displays information such as a result determined by the evaluation unit 27 and an output terminal for outputting a signal of a determination result to an outside of the testing device 100.

The control unit 33 operates the units described above in accordance with an instruction input from the input unit 29 or a program prepared in advance. That is, the control unit 33, the vibration distribution determination unit 45, and the evaluation unit 27 are implemented by a computer device which is a hardware resource including a calculation unit such as a CPU, and a storage unit such as a memory and a storage, and embody driving and information processing of the units by software.

<Joined Body>

Figure 2:
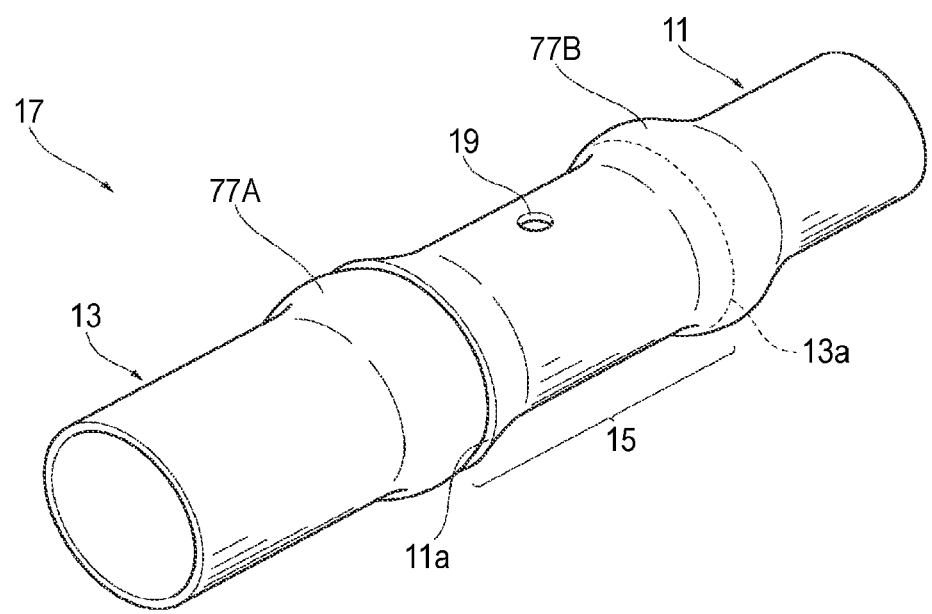
FIG. 2 is a schematic perspective view schematically showing an appearance of an example of a joined body.

FIG. 2 is a schematic perspective view schematically showing an appearance of an example of the joined body.

In the joined body 17 shown here, the second pipe member 13 having an outer diameter smaller than that of the first pipe member 11 having at least one through hole 19 is inserted into the first pipe member 11 and the first pipe member 11 and the second pipe member 13 are overlapped, and the second pipe member 13 at an overlapped portion is expanded by electromagnetic molding to form the joining portion 15.

A material pipe of the first pipe member 11 before electromagnetic molding is not limited to a circular pipe, may be a square pipe having a square or rectangular cross section, a hexagonal pipe having a hexagonal cross section, or an octagonal pipe having an octagonal cross section, and can be manufactured by extrusion or plate material welding. When a cross-sectional shape of the first pipe member 11 is circular, the second pipe member 13 is preferably formed in a similar shape such as a circular cross section in the same manner, but different cross sections which are not similar to each other may be combined.

A material of the first pipe member 11 can be appropriately selected from a steel material (normal steel, high-tensile steel), an aluminum alloy (for example, JIS 6000 series, 7000 series, and the like, which are heat treatment type alloys), a resin, and the like.

A material pipe of the second pipe member 13 before electromagnetic molding is the same as the first pipe member 11, is not limited to a circular pipe, may be a square pipe having a square or rectangular cross section, a hexagonal pipe having a hexagonal cross section, or an octagonal pipe having an octagonal cross section, and can be manufactured by extrusion or plate material welding. Preferable examples of a material of the second pipe member 13 include an aluminum alloy (for example, JIS 6000 series, 7000 series, and the like, which are heat treatment type alloys) capable of electromagnetic expansion. The first pipe member 11 and the second pipe member 13 may be made of the same material or may be made of different materials.

Here, a description will be given using a joined body in which a first pipe member and a second pipe member having different diameters and circular cross sections perpendicular to the axial direction are expanded by electromagnetic molding inside a molding jig, and the respective members are swaged and joined to each other, but a test target is not limited thereto. In addition, as an expansion method, various methods such as hydraulic pipe expansion and rubber pipe expansion can be adopted in addition to the electromagnetic molding.

In order not to reduce a joining force of the swaging joining, the through hole 19 preferably has a hole diameter of less than φ10 mm, and preferably has a hole diameter of φ5 mm or less, more preferably φ4 mm or less when a thickness of the first pipe member 11 is 2 mm. In both cases, the hole diameter is preferably φ2 mm or more.

<Electromagnetic Molding>

Figure 3:
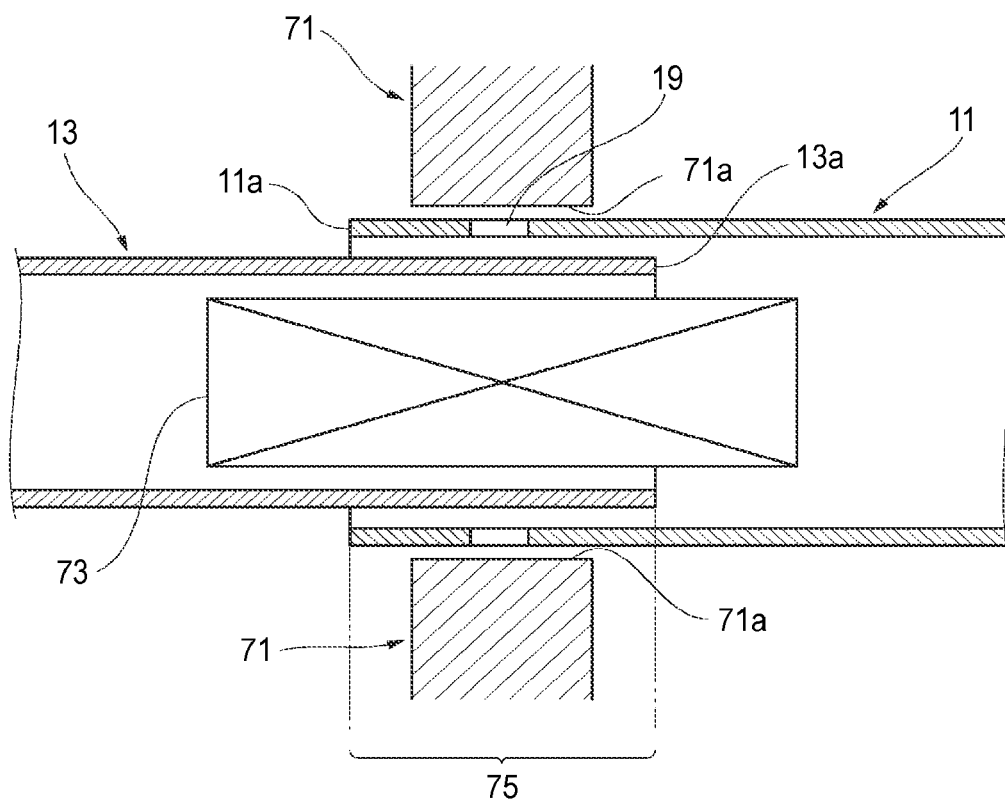
FIG. 3 is a diagram showing a state before the joined body shown in FIG. 2 is electromagnetically molded, and is a schematic cross-sectional diagram showing an arrangement example of a molding jig, a first pipe member, a second pipe member, and a coil for electromagnetic molding.

FIG. 3 is a diagram showing a state before the joined body 17 shown in FIG. 2 is electromagnetically molded, and is a schematic cross-sectional diagram showing an arrangement example of the molding jig 71, the first pipe member 11, the second pipe member 13, and the coil 73 for electromagnetic molding.

The molding jig 71 includes a pressing portion 71a that receives a force with which the first pipe member 11 and the second pipe member 13 expand when a Lorentz force is generated in the second pipe member 13 by an excitation magnetic field from the coil 73 during electromagnetic molding. Preferable examples of the material of the molding jig 71 include steel (for example, SUS304, SS400, or the like), an aluminum extruded material, an aluminum casting, and a resin injection molding material. The molding jig 71 of this configuration is divided into a plurality of blocks in a circumferential direction of the first pipe member 11. The plurality of blocks are connected to one another by an appropriate joining means such as a bolt to form the annular pressing portion 71a.

As preparation for electromagnetic molding, first, one pipe end 13a of the second pipe member 13 is inserted from one pipe end 11a of the first pipe member 11, and an overlapping portion 75 at which the first pipe member 11 and the second pipe member 13 overlap in a radial direction is formed. The molding jig 71 is arranged along the circumferential direction on a radially outer side of the overlapping portion 75. In addition, the coil 73 for electromagnetic molding is arranged in the second pipe member 13. The arrangement order described above is an example and is not limited thereto, and arrangement can be performed in any order.

Although not shown, the coil 73 is connected to an external power supply unit through a conductor, and is inserted into the second pipe member 13 manually or by a sliding operation by a known moving mechanism. Further, the coil 73 is positioned at a desired arrangement position, and is fixed in a pipe axial direction by an appropriate fixing mechanism. The first pipe member 11, the second pipe member 13, and the coil 73 are arranged concentrically with one another. In addition, an interval between the pressing portion 71a on an inner side of the molding jig 71 and an outer circumferential surface of the first pipe member 11 is constant.

At least one through hole 19 is formed in the first pipe member 11. Only one through hole 19 may be provided, but the through hole 19 is preferably provided at a plurality of portions different from one another. The pressing portion 71a of the molding jig 71 is arranged at a corresponding position on a radially outer side of the through hole 19. That is, on the radially outer side of the first pipe member 11, the pressing portion 71a of the molding jig 71 is arranged to overlap in the radial direction so as to cover the through hole 19.

A shape of the through hole 19 is circular (perfect circle) in a plan view, but is not limited thereto, and may be a polygonal shape such as a triangular shape or a quadrangular shape, or may be another shape such as an elliptical shape or an L-shape.

When the coil 73 is energized in the state shown in FIG. 3, the second pipe member 13 is electromagnetically expanded. At this time, an energy of, for example, about 16 kJ is instantaneously applied to the coil 73 from the power supply unit (not shown), and an eddy current is excited in the second pipe member 13 facing the coil 73. The eddy current generates, in the second pipe member 13, a Lorentz force toward the outside in the radial direction, and the second pipe member 13 is expanded by the generated Lorentz force.

Figure 4:
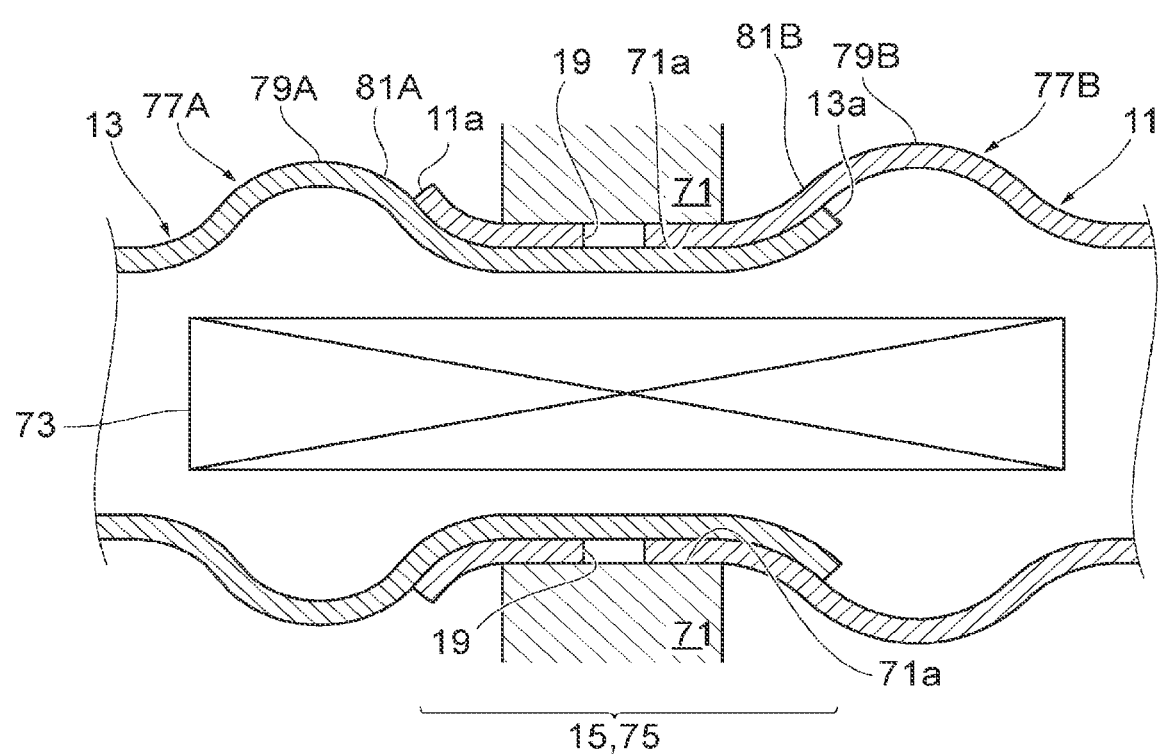
FIG. 4 is a schematic cross-sectional diagram schematically showing a state in which an overlapping portion between the first pipe member and the second pipe member is electromagnetically molded.

FIG. 4 is a schematic cross-sectional diagram schematically showing a state in which the overlapping portion 75 between the first pipe member 11 and the second pipe member 13 is electromagnetically molded.

When the second pipe member 13 is expanded, the first pipe member 11 is expanded following expansion deformation of the second pipe member 13. The outer circumferential surface of the first pipe member 11 is pressed against and brought into close contact with the pressing portion 71a of the molding jig 71, and further diameter increase is restricted. In addition, expansion of the second pipe member 13 and the first pipe member 11 further proceeds on both sides of the pressing portion 71a in the pipe axial direction. Accordingly, annular bulging portions 77A and 77B bulging outward in the radial direction are formed on both sides of the molding jig 71 in the pipe axial direction at portions overlapping a region where the coil 73 is arranged.

In the case of this configuration, the annular bulging portion 77A is mainly formed on the second pipe member 13, and the annular bulging portion 77B is mainly formed on the first pipe member 11. In addition, the pipe end 11a of the first pipe member 11 is increased in diameter along an inclined surface 81A of the second pipe member 13 on a side of the annular bulging portion 77A, which is closer to the molding jig 71 than a maximum diameter portion 79A. The pipe end 13a of the second pipe member 13 is inclined outward in the radial direction on a side of the annular bulging portion 77B, which is closer to the molding jig 71 than a maximum diameter portion 79B of the first pipe member 11, and is increased in diameter, such that an inclined surface 81B is formed on the first pipe member 11.

The second pipe member 13 facing the through hole 19 of the first pipe member 11 hardly bulges radially outward in the through hole 19. Therefore, the second pipe member 13 is maintained in a state of being in contact with an inner edge of the through hole 19 without being engaged (swaged) with the inner edge of the through hole 19.

<Joining State of Joining Portion and Propagation Characteristics of Elastic Wave Vibration>

Here, the joining state of the joining portion 15 formed by the electromagnetic molding as described above will be described in more detail.

Figure 5:
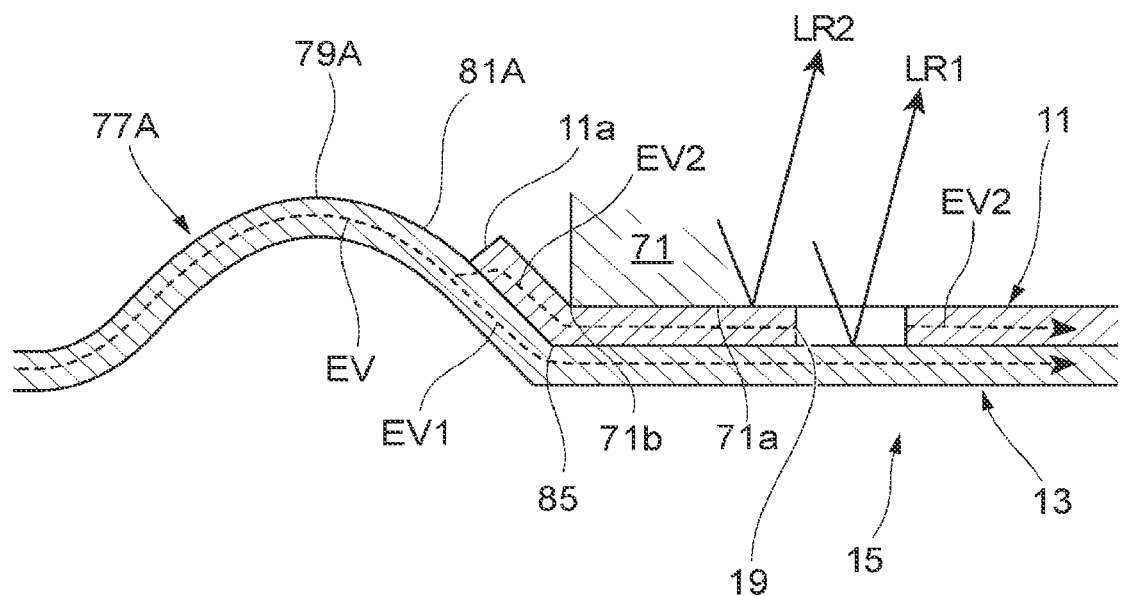
FIG. 5 is an enlarged cross-sectional diagram of an annular bulging portion and the joining portion shown in FIG. 4, and is a diagram showing a state in which a joining strength between the first pipe member and the second pipe member is high.
Figure 6:
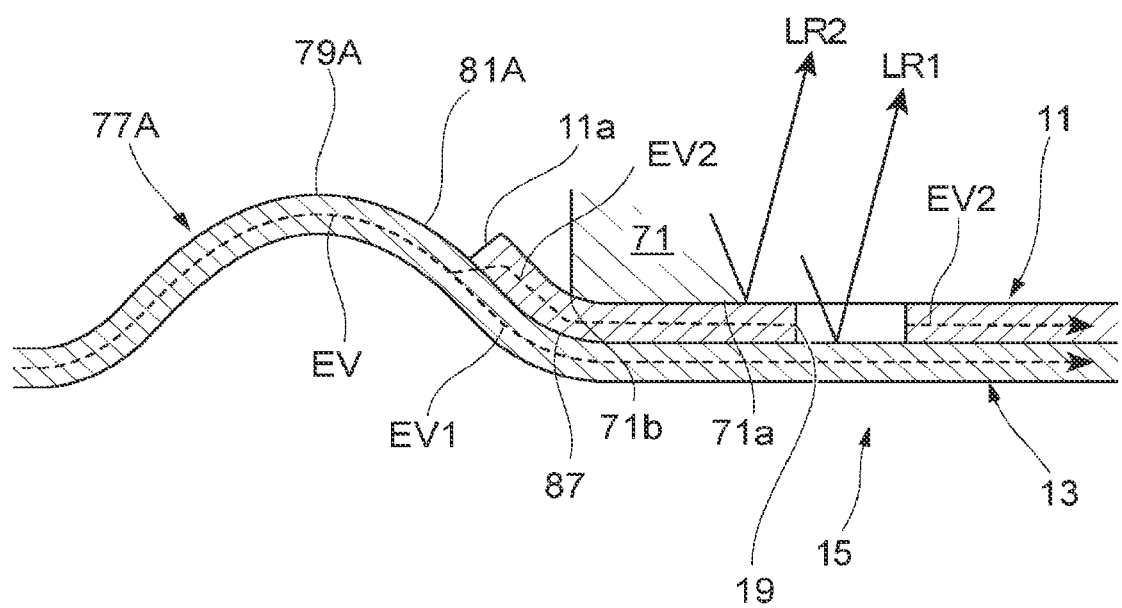
FIG. 6 is an enlarged cross-sectional diagram of the annular bulging portion and the joining portion shown in FIG. 4, and is a diagram showing a state in which the joining strength between the first pipe member and the second pipe member is low.

FIGS. 5 and 6 are enlarged cross-sectional diagrams of the annular bulging portion 77A and the joining portion 15 shown in FIG. 4, FIG. 5 is a diagram showing a state in which the joining strength between the first pipe member 11 and the second pipe member 13 is high, and FIG. 6 is a diagram showing a state in which the joining strength between the first pipe member 11 and the second pipe member 13 is low.

As shown in FIG. 5, by the electromagnetic expansion of the second pipe member 13, the first pipe member 11 is pressed against the pressing portion 71a of the molding jig 71, and a portion close to the pipe end 11a deviated from the pressing portion 71a is increased in diameter along the inclined surface 81A of the second pipe member 13. An expansion force of the second pipe member 13 is locally concentrated at an edge portion 71b of the pressing portion 71a, a bent portion 85 due to stress concentration is generated in the first pipe member 11 and the second pipe member 13 corresponding to the edge portion 71b, and a swaging portion between the first pipe member 11 and the second pipe member 13 is formed in the bent portion 85. When the swaging portion is formed, the degree of close contact of the joining portion 15 is also high.

On the other hand, as shown in FIG. 6, depending on conditions of the electromagnetic expansion, a large stress concentration does not occur in a curved portion 87 of the first pipe member 11 and the second pipe member 13 corresponding to the edge portion 71b of the pressing portion 71a, and as a result, the swaging portion is not formed, and a relatively loose joining state may be obtained. In this case, the degree of close contact of the joining portion 15 is low.

The vibration propagation characteristics of the pipe member are different between a case where a swaging portion is formed in the bent portion 85 of the first pipe member 11 and the second pipe member 13 by electromagnetic molding so that the first pipe member 11 and the second pipe member 13 are firmly joined to each other as shown in FIG. 5, and a case where the first pipe member 11 and the second pipe member 13 are loosely joined to each other as shown in FIG. 6.

That is, when the first pipe member 11 and the second pipe member 13 are firmly joined to each other, as indicated by an arrow EV in FIG. 5, in a case where an elastic wave vibration is applied from a portion separated from the joining portion 15 so as to avoid the through hole 19 of the second pipe member 13, the elastic wave vibration is propagated toward the joining portion 15. The elastic wave vibration is also propagated from the second pipe member 13 to the first pipe member 11 at the pipe end 11a of the first pipe member 11, and is divided into a vibration indicated by an arrow EV1 along the second pipe member 13 and a vibration indicated by an arrow EV2 along the first pipe member 11. These vibrations are propagated along the second pipe member 13 and the first pipe member 11. Similarly, even in the case where the first pipe member 11 and the second pipe member 13 are loosely joined to each other as shown in FIG. 6, the propagated elastic wave vibration is divided into the vibration indicated by the arrow EV1 and the vibration indicated by the arrow EV2 from the pipe end 11a of the first pipe member 11.

The vibration indicated by the arrow EV1 and the vibration indicated by the arrow EV2 are different from each other in a state of the vibration propagated from the second pipe member 13 to the first pipe member 11 according to the joining state. When the first pipe member 11 and the second pipe member 13 are firmly joined and have a high degree of close contact, the EV1 and the EV2 vibrate integrally. On the other hand, when the first pipe member 11 and the second pipe member 13 are loosely joined and have a low degree of close contact, EV1 and EV2 vibrate independently of each other, and thus strength ratios of the vibrations are different from each other at the joining portion 15.

Therefore, the through hole 19 is formed in a region of the joining portion 15, and the vibration distribution of the second pipe member 13 due to the elastic wave vibration is obtained from LR1 through the through hole 19. In addition, the vibration distribution of the first pipe member 11 due to the elastic wave vibration in the vicinity of the through hole 19 is obtained from LR2. Further, the degree of close contact at the portion of the through hole 19 is evaluated according to the difference between the vibration distributions. That is, the vibration distribution of the second pipe member 13 exposed from the through hole 19 formed at any position of the joining portion 15 and the vibration distribution of the first pipe member 11 in the vicinity of the through hole 19 are detected by the above testing device 100, and the degree of close contact at any position of the joining portion 15 can be accurately evaluated according to a difference between the detected vibration distributions. In this way, the degree of close contact of the joining portion 15, which is difficult to measure, becomes clear, so that a mechanical strength of the joined body 17 can be accurately grasped, and whether the quality is appropriate can be determined with high accuracy.

<Testing Method for Joined Body>

Next, a procedure of a testing method for a joined body for evaluating, using the testing device 100, the degree of close contact of the joined body 17 in which the first pipe member 11 and the second pipe member 13 are joined will be described in detail.

Figure 7:
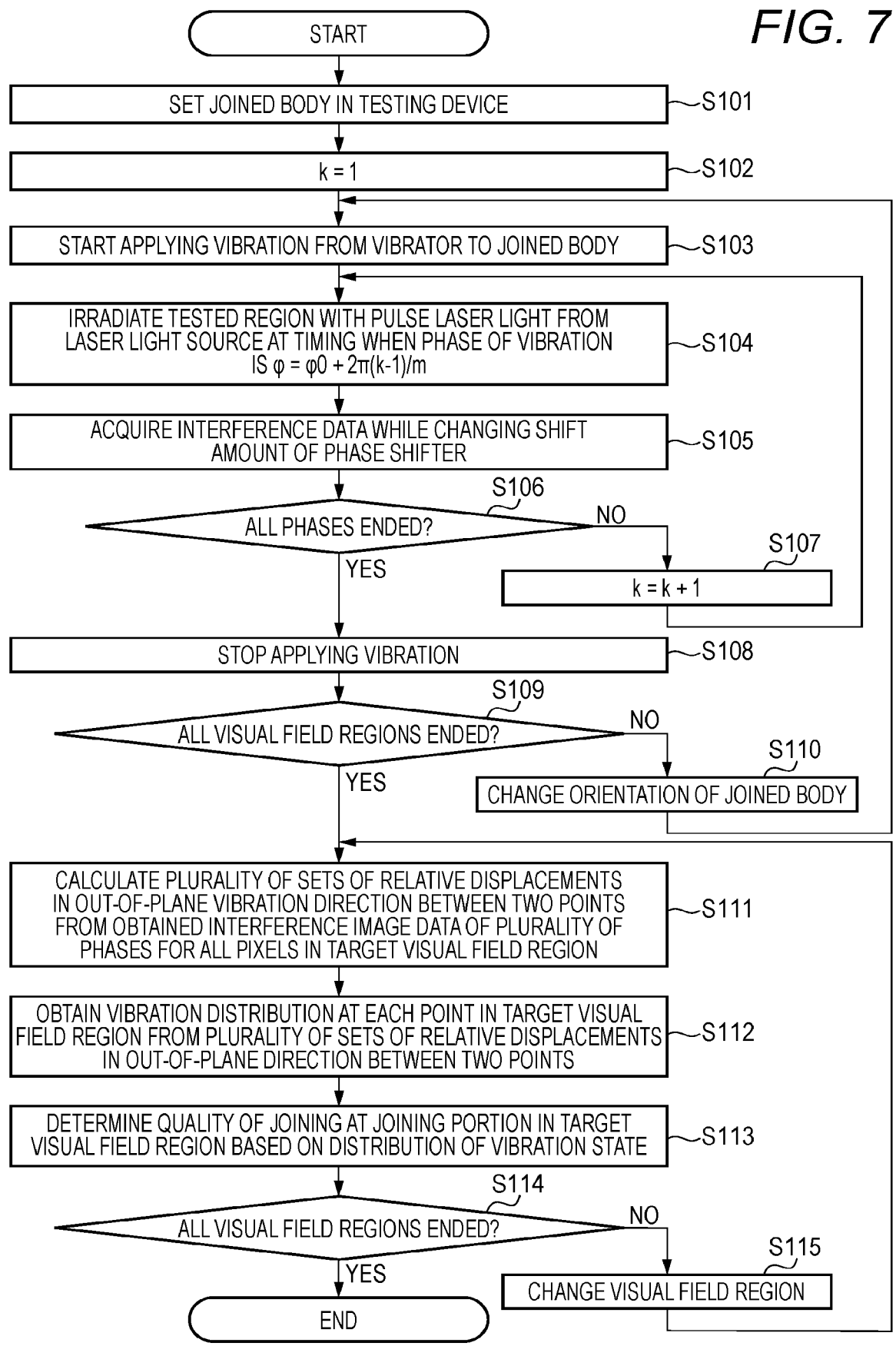
FIG. 7 is a flowchart showing a procedure of a testing method for a joined body.

FIG. 7 is a flowchart showing a procedure of the testing method for the joined body. Hereinafter, description will be made with reference to this flowchart. The procedure described below is executed by the control unit 33 shown in FIG. 1 according to a predetermined program or according to information input by the operator, or is manually operated by the operator.

First, the operator causes the gripping portions 39A and 39B of the relative movement mechanism 25 to grip the end portions of the joined body 17. Then, the joined body 17 is set in the testing device 100 by the operator or by driving the relative movement mechanism 25 such that the joining portion 15 of the joined body 17 is arranged in the visual field region IA (FIG. 1) of the testing device 100 (step 101, hereinafter referred to as S101).

The visual field region IA is a region seen in a planar shape from a speckle sharing interferometer 63 side. On the other hand, since the joining portion 15 has a curved surface shape on the circumferential surface of the tubular joined body 17, only a part of the outer circumferential surface of the joining portion 15 is included in one visual field region IA. Therefore, after the measurement on the vibration is performed in one visual field region IA, an operation of rotating the joined body 17 by (360/n) degrees by the relative movement mechanism 25 and performing the measurement in the visual field region IA at another circumferential position is repeated a plurality of times to perform the measurement on the entire circumferential direction of the joining portion 15. When the through hole 19 is present in the visual field region IA, the second pipe member 13 exposed from the through hole 19 is measured. Here, it is assumed that the number of times of changing the visual field region IA by rotating the joined body 17 is n (n is an integer of 2 or more). The n visual field regions IA in which the vibration measurement is performed are represented as $IA_1$, $IA_2$, and $\sim IA_n$, respectively. Here, it is assumed that n=4 and an angle at which the joined body 17 is rotated is 90 degrees per rotation.

First, measurement in the visual field region $IA_1$ is started.

In one visual field region, measurement is performed m times (m is an integer of 3 or more) while varying a phase of the vibration of the vibrator 37. The phase of the vibration of the vibrator 37 is a phase of the AC electric signal transmitted from the signal generator 35 to the vibrator 37, and corresponds to a phase of the vibration excited by the joined body 17 at a contact point with the vibrator 37. Here, m=3, and each measurement is represented as "k-th measurement" using a phase index k (an integer from 1 to m).

First, k=1 is set as the first measurement (S102). Then, an AC electric signal is transmitted from the signal generator 35 to the vibrator 37 to start applying vibration from the vibrator 37 to the joined body 17 (S103).

Next, the signal generator 35 transmits a pulse signal to the laser light source 47 at each timing at which the phase of the vibration of the vibrator 37 is represented by $[\varphi_0 + 2\pi(k-1)/m]$ using a predetermined initial value (for example, $\varphi_0 = 0$). Since k=1 at this stage, the phase of the vibration of the vibrator 37 when the pulse signal is transmitted is $\varphi_0$.

The laser light source 47 repeatedly emits the pulse laser light LB every time the pulse signal is received. A beam spot of the pulse laser light LB is increased in diameter by the beam shaping lens 49, and the surface of the joined body 17 including the visual field region IA is irradiated with the pulse laser light LB (S104).

The pulse laser light LB is reflected by the surface of the joined body 17 and is incident on the beam splitter 51 of the speckle sharing interferometer 63. A part of the reflected light (first reflected light LR1) is reflected by the beam splitter 51, passes through the phase shifter 57, is reflected by the first reflecting mirror 53, and passes through the phase shifter 57 again. A part of the first reflected light LR1 passes through the beam splitter 51, and is incident on the image sensor 61 via the condensing lens 59. The rest of the reflected light (second reflected light LR2) incident on the beam splitter 51 passes through the beam splitter 51 and is reflected by the second reflecting mirror 55. A part of the second reflected light LR2 is reflected by the beam splitter 51, and is incident on the image sensor 61 via the condensing lens 59. The image sensor 61 detects, by different detection elements, the reflected light reflected at a large number of points on the surface of the joined body 17. In addition to the reflected light reflected at a specific point on the surface of the joined body 17, the reflected light reflected at a point slightly deviated from the specific point is also incident on the detection elements.

The phase shifter 57 changes (shifts) the phase of the irradiation light passing through the phase shifter 57 while the reflected light (first reflected light LR1) of the pulse laser light LB is repeatedly output. Accordingly, a phase difference between the reflected light that is reflected at a specific point on the surface of the joined body 17 and is incident on a specific detection element of the image sensor 61 and the reflected light that is reflected at a point slightly deviated from the specific point and is incident on the same detection element changes. During the change in phase difference, each detection element of the image sensor 61 detects an intensity of an interference light caused by interference of the two reflected lights (S105).

Figure 8:
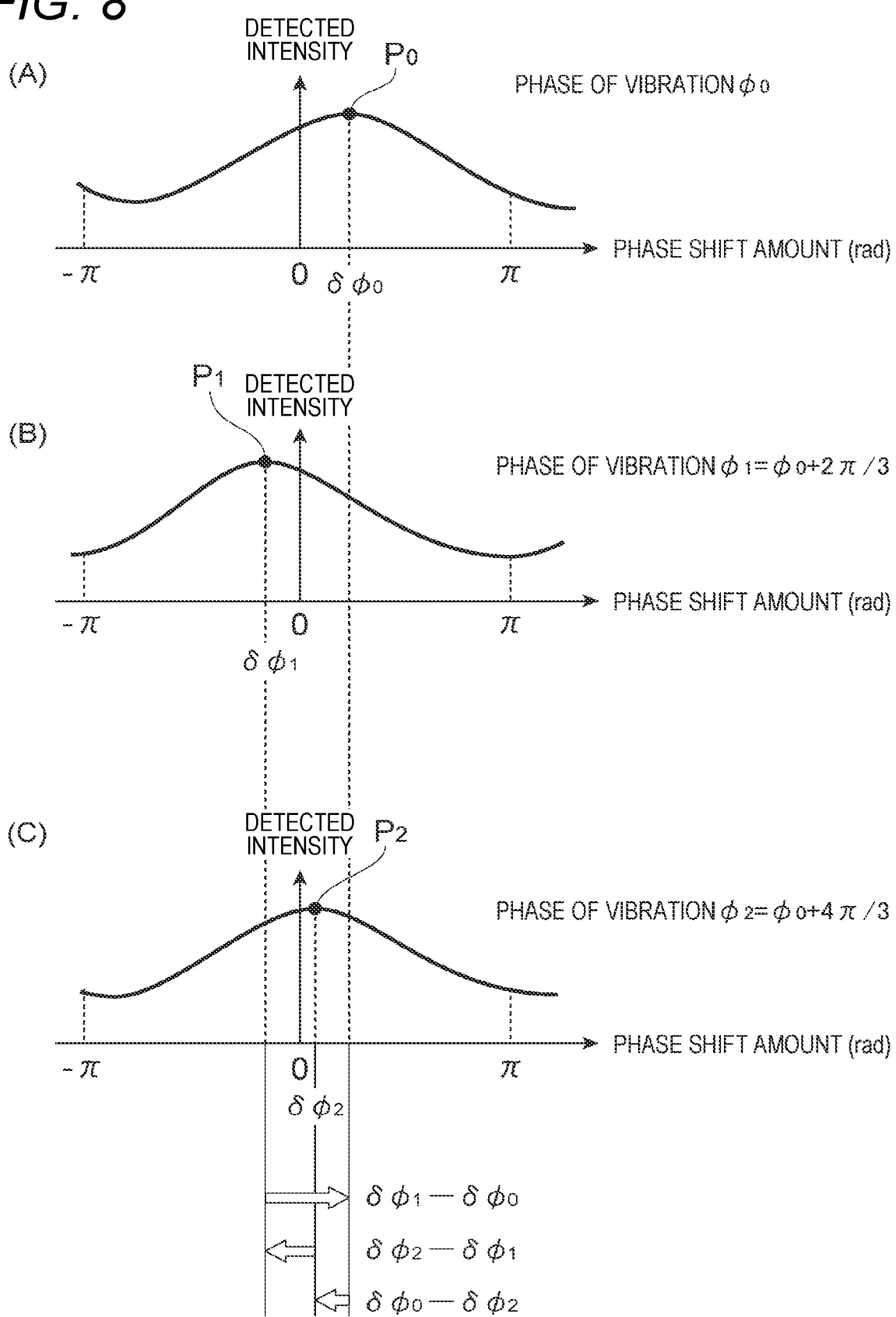
FIG. 8 is a diagram showing a method of obtaining a state of vibration at each point in a visual field region in (A) to (C)

FIG. 8 is a diagram showing a method of obtaining a state of vibration at each point in the visual field region IA in (A) to (C).

(A) of FIG. 8 is a graph showing an example of a phase shift amount by the phase shifter 57, which is obtained when the phase of the vibration of the vibrator 37 is $\varphi_0$, and an intensity of an interference light detected by the detection element of the image sensor 61. In (A) of FIG. 8, a relation in which the detected intensity changes sinusoidally with respect to the phase shift amount is shown by a continuous curve, but what is actually measured is discrete data. Therefore, in order to reproduce the continuous sine waveform from the measured discrete data by the least squares method or the like, it is necessary to detect intensities in at least three different phase shift amounts.

Subsequently, it is confirmed whether all measurements in which the phases of m (m=3) vibrations are made different are ended (S106). At this stage, since the phase index k=1 and the phase index k does not reach m (m=3), the phase index k is increased by 1 to "2" (S107).

Next, returning to S104, the signal generator 35 transmits a pulse signal to the laser light source 47 at each timing when the phase of the vibration of the vibrator 37 is [$\varphi_0+2\pi(k-1)/m$] and k=2, that is, [$\varphi_0+2\pi/3$]=$\varphi_1$. The laser light source 47 repeatedly irradiates the surface of the joined body 17 with the pulse laser light LB at a timing when the pulse signal is received.

Then, while the phase shifter 57 changes (shifts) the phase of the reflected light reflected at each point in the visual field region $IA_1$ to at least three values, each detection element of the image sensor 61 detects the intensity of the interference light (S105).

(B) of FIG. 8 is a graph showing a phase shift amount by the phase shifter 57, which is obtained when the phase of the vibration of the vibrator 37 is (pi in the second measurement (k=2), and an intensity of an interference light detected by the detection element of the image sensor 61. Comparing the graph in (B) of FIG. 8 with the graph in (A) of FIG. 8, peak positions $P_0$ and $P_1$ of the intensities of the interference lights are deviated from each other by $\delta\varphi_1-\delta\varphi_0$. This deviation indicates that a phase difference in an optical path between the reflected light reflected at a specific point on the surface of the joined body 17 and the reflected light reflected at a point slightly deviated from the specific point is changed due to the difference in phase of the vibration of the vibrator 37 at the time of detection. The change in phase difference of the optical path indicates that a relative position of the two points in an out-of-plane vibration direction changes.

In this way, after the operation in S105 in the second measurement (k=2) is performed, the phase index k does not reach m (m=3) in S106, and thus the phase index k is increased by 1 to "3" (S107). Thereafter, returning to S104, the laser light source 47 repeatedly irradiates the surface of the joined body 17 with the pulse laser light LB at each timing when the phase of the AC electric signal is [$\varphi_0+2\pi(k-1)/m$] and k=3, that is, [$\varphi_0+4\pi/3$]=$\varphi_2$, and each detection element of the image sensor 61 detects the intensity of the interference light (S105).

In this way, as shown in (C) of FIG. 8, a relation between an intensity of an interference light and a phase shift amount by the phase shifter 57 when the phase of the AC electric signal is $\varphi_2$ is obtained.

Thereafter, in S106, since the phase index k is 3 and reaches m (m=3), the transmission of the AC electric signal from the signal generator 35 to the vibrator 37 is stopped, whereby the vibrator 37 stops the vibration (S108).

By the operations so far, the acquisition of data in the visual field region $IA_1$ is ended.

In S109, it is determined whether the acquisition of the data in all the visual field regions is ended. Here, since the measurement on the vibration in the visual field region $IA_1$ is ended, the joined body 17 is rotated about the axis thereof by (360/n) degrees by the relative movement mechanism 25 to change an orientation of the joined body 17.

Accordingly, the visual field region $IA_1$ is changed to the visual field region $IA_2$ (S110).

Thereafter, returning to S103, by performing the operations in S103 to S108 described above on the new visual field region $IA_2$, a relation between a phase shift amount and an intensity of an interference light at each point of the visual field region $IA_2$ is acquired.

Thereafter, in S109, it is determined whether the acquisition of the data in all the visual field regions is ended. Here, since the measurement on the vibration of the visual field region $IA_2$ is ended, the visual field region $IA_2$ is changed to the visual field region $IA_3$ again in S110. Then, by performing the operations of S103 to S108 described above on the new visual field region $IA_3$, a relation between a phase shift amount and an intensity of an interference light at each point of the visual field region $IA_3$ is acquired.

When the above operation is ended, the measurement on the vibration is ended, and thereafter, the obtained data is analyzed. The data is analyzed one by one for n (n=3) visual field regions ($IA_1$, $IA_2$, $IA_3$). First, the vibration distribution at each point in the visual field region $IA_1$ is obtained.

First, for each detection element of the image sensor 61, maximum output phase shift amounts $\delta\varphi_0$, $\delta\varphi_1$, and $\delta\varphi_2$ at peak positions ($P_0$, $P_1$, and $P_2$) at which the output of the detection element becomes maximum are obtained while the phase shift amount by the phase shifter 57 is changed at the phases $\varphi_0$, $\varphi_1$, and $\varphi_2$ of each vibration (see the graphs in (A) of FIG. 8 to (C) of FIG. 8).

Then, differences ($\delta\varphi_1-\delta\varphi_0$), ($\delta\varphi_2-\delta\varphi_1$), and ($\delta\varphi_0-\delta\varphi_2$) of the maximum output phase shift amounts having different phases of vibration are obtained. These three differences of the maximum output phase shift amounts indicate a total of three sets of relative displacements in the out-of-plane vibration direction between a specific point and a point at a position slightly deviated from the specific point at each point in the visual field region, with two pieces of data having different phases (that is, different times) of vibration of the vibrator 37 (S111). Based on these three sets of relative displacements, values of three parameters including the amplitude of the vibration, the phase of the vibration, and a center value (DC component) of the vibration at each point in the visual field region are obtained (S112).

The values of the amplitude and the phase of the vibration at each point obtained in this manner have information indicating the quality of the joining at the joining portion 15 as follows. As described above, when the first pipe member 11 and the second pipe member 13 are well joined to each other, the first pipe member 11 and the second pipe member 13 are restrained to each other, and thus the vibration is attenuated in the vicinity of the joining portion 15. On the other hand, when there is a minute gap between the first pipe member 11 and the second pipe member 13 and the first pipe member 11 and the second pipe member 13 are not well joined to each other, the first pipe member 11 and the second pipe member 13 are not restrained to each other at the joining portion 15 and the periphery thereof, and the vibration is not attenuated. Therefore, the quality of the joining can be determined from the obtained vibration distribution at the joining portion 15 (S113).

In the case of the joining portion 15 described above, most of the region of the visual field region IA is the outer circumferential surface of the first pipe member 11 arranged on the radially outer side of the second pipe member 13. Here, when the first pipe member 11 and the second pipe member 13 are swaged and joined in a minute region as in the bent portion 85 shown in FIG. 5 described above, even when the vibration of the first pipe member 11 on the outer side is sufficiently attenuated, the vibration of the second pipe member 13 on the inner side may not be attenuated depending on the swaging state. Such a situation may occur, for example, when another circumferential portion along the circumferential direction of the first pipe member 11 is firmly joined to the second pipe member 13 with a high degree of close contact, and the degree of close contact between the first pipe member 11 and the second pipe member 13 is low due to insufficient swaging at only a portion in the circumferential direction (a portion of the visual field region IA).

Therefore, in the present testing method for the joined body, by forming the through hole 19 in the first pipe member 11 at the joining portion 15, the second pipe member 13 whose outer circumferential surface is hidden by the first pipe member 11 is exposed through the through hole 19, and the vibration distribution of the outer circumferential surface of the exposed second pipe member 13 is measured together with the vibration distribution of the first pipe member. Accordingly, the vibration distribution of the second pipe member 13 at the joining portion 15 can be measured, and the degree of close contact can be evaluated with higher accuracy.

Therefore, the through hole 19 is preferably arranged at a position at which the joining strength of the joining portion 15 is particularly affected. For example, the vicinity of the bent portion 85 shown in FIG. 5 or a central position of the joining portion 15 in the pipe axial direction may be used. In addition, the through hole 19 is preferably arranged at any position as necessary, and the vibration distribution of the second pipe member 13 at the arrangement position of the through hole 19 is measured.

After the quality of the joining (close contact) at the joining portion 15 in the visual field region $IA_1$ is determined in this manner, the quality of the joining is sequentially determined for the other visual field regions $IA_2$, $IA_3$, and $IA_4$ in the same manner (S114).

In the example described above, the number of times of measurement with different phases of vibration is set to m (m=3), but by setting the number of times of measurement m to be larger than the number represented by [2N+1] (N is a natural number of 2 or more), it is possible to detect up to a N-th order component (N-th harmonic component) of the vibration excited on the joined body 17. In this way, the quality of the joining (close contact) at the joining portion 15 may be determined based on the vibration distribution of the harmonic component together with a fundamental wave.

<Testing Method for Joined Body for Applying Vibrations Under a Plurality of Different Conditions>

Next, a testing method for a joined body (second testing method) will be described in which the test accuracy is further improved compared to the first testing method for the joined body by further applying vibrations under a plurality of different conditions to the above testing method for the joined body (first testing method).

Figure 9:
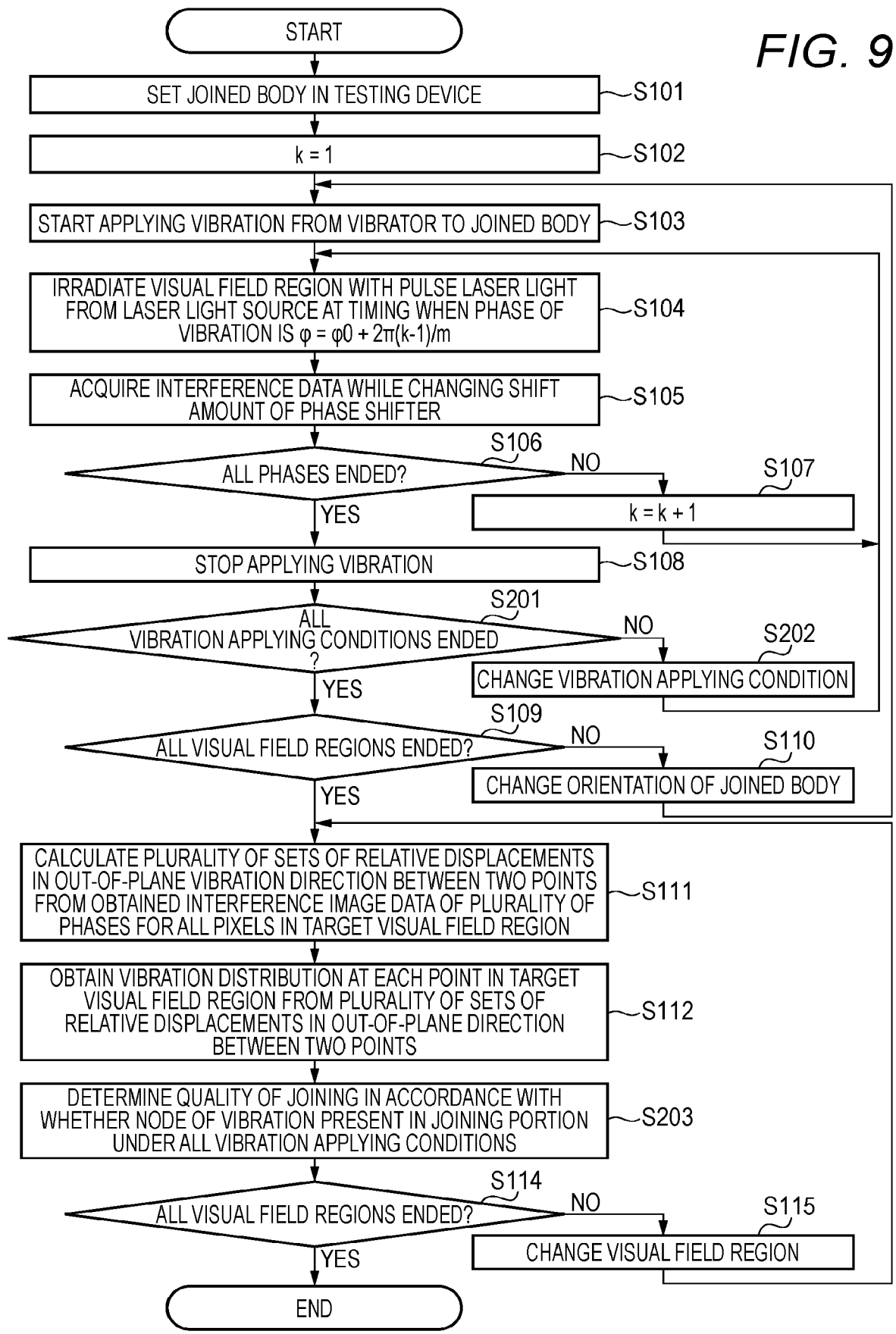
FIG. 9 is a flowchart showing a procedure of another testing method for a joined body.

FIG. 9 is a flowchart showing a procedure of the second testing method. In the following description, the same procedures as those in the flowchart shown in FIG. 7 are denoted by the same reference numerals (step numbers) to simplify or omit the description thereof.

The second testing method has the same procedure as the first testing method except that the procedures of S201 and S202 are added to the procedure of the first testing method described above and the procedure of S113 is changed to the procedure of S203.

In the second testing method for the joined body, one or both of a position where the vibrator 37 is brought into contact with the joined body 17 (that is, a position where a vibration is applied) and a vibration frequency of the vibrator 37 are made different in one visual field region, and a plurality of kinds of vibration states are measured. Here, it is assumed that the types of vibration states are M types (M is an integer of 2 or more). As the number of types of the vibration state increases, the quality of the joining can be more reliably determined, and the time required for the measurement increases accordingly. Therefore, the number of types is preferably about 3 to 5 in general.

In the following description, the position at which a vibration is applied and the frequency are referred to as "vibration applying conditions".

First, as in the first testing method described above, the joined body 17 is set in the testing device 100 (S101), and the procedures of S102 to S108 are performed on the visual field region $IA_1$ under a first vibration applying condition.

Then, the procedure of S103 to S108 is repeated until the measurement under all types (M types) of vibration applying conditions is ended (S201). That is, the first vibration applying condition is changed to a second vibration applying condition (S202), that is, the position of the vibrator 37 and/or the vibration frequency of the vibrator 37 are changed, and the procedure of S103 to S108 is performed. Further, the second vibration applying condition is changed to a third vibration applying condition, and the above procedure is repeated in the same manner. In this way, the measurement under all (M types) vibration applying conditions is ended.

After performing the procedure of S103 to S201 for the visual field region $IA_1$, the procedure of S103 to S201 is sequentially performed for the visual field regions $IA_2$, $IA_3$, and $IA_4$ (S109, S110). When the above procedure is ended for all the visual field regions, the vibration distribution in the visual field region $IA_1$ is obtained (S111, S112), and the quality of the joining is determined as follows.

In a case of a good joining state in which the joining portion 15 is firmly joined and in a case of loose joining, the vibration distribution changes depending on a difference in a generation state of the vibration at the joining portion 15. Therefore, the quality of the joining in the vicinity of the joining portion 15 can be determined from the detected vibration distribution.

However, even when a standing wave is generated in the joined body 17, the amplitude of the vibration becomes small. Therefore, when the quality of the joining is determined based on only one vibration state, in a case where a node of the standing wave is accidentally formed at the position of the joining portion 15 even though the joining is poor, it may be erroneously determined that the joining is good. Therefore, the vibration state is measured under a plurality of vibration applying conditions with respect to one visual field region, and only when it is confirmed that the amplitude of the vibration is small at the joining portion 15 under all the vibration applying conditions, it is determined that the joining is good (S203).

After the determination for one visual field region $IA_1$ is ended in S203, the visual field region is changed to the next visual field region (S115), the procedure of S111 to S203 described above is repeated for the visual field regions $IA_2$, $IA_3$, and $IA_4$, and the determination for all visual field regions is ended (S114).

Thus, a series of operations is ended.

According to the present testing method, it is possible to prevent the determination on the quality of the joining from being erroneously recognized by the node of the standing wave of the vibration, and it is possible to more accurately evaluate the degree of close contact at the joining portion 15.
<Another Example of Electromagnetic Molding and Testing Method for Joined Body in that Case>

Next, another example of electromagnetically molding the joining portion 15 will be described.

As shown in FIG. 3, the joining portion 15 described above is formed by inserting the second pipe member 13 into the first pipe member 11, forming the overlapping portion 75 in which the first pipe member 11 and the second pipe member 13 are overlapped in the radial direction, and electromagnetically expanding the overlapping portion 75. Here, the molding jig arranged on the radially outer side of the first pipe member 11 is changed from a configuration in which the molding jig is arranged in an annular shape to a configuration in which the molding jig is divided in the circumferential direction. Accordingly, the first pipe member 11 and the second pipe member 13 are joined to each other with a large degree of close contact particularly at portions to be pressed against the plurality of divided molding jigs.

Figure 10:
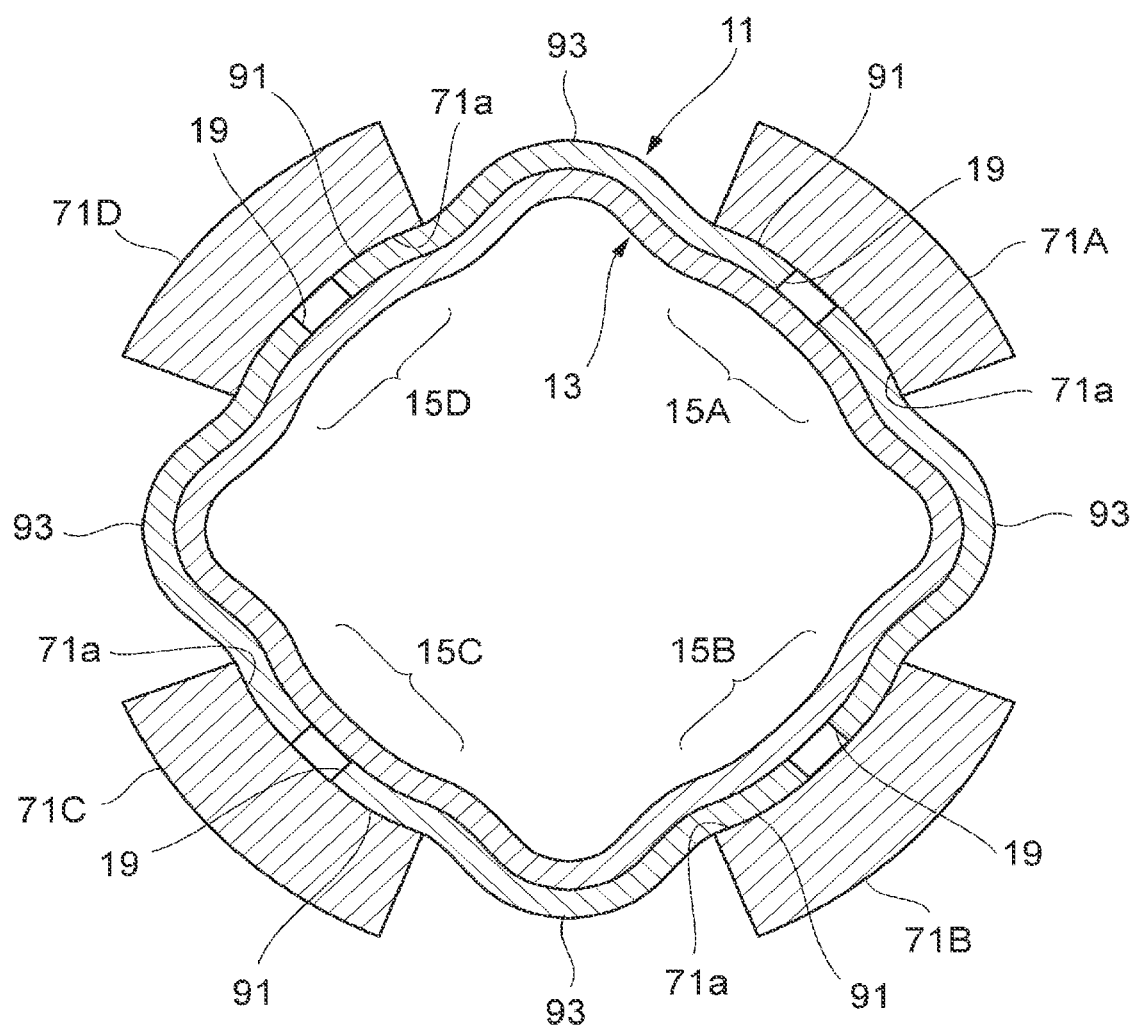
FIG. 10 is a schematic cross-sectional diagram of a joined body showing a state in which the first pipe member and the second pipe member are electromagnetically molded using a plurality of divided molding jigs.

FIG. 10 is a schematic cross-sectional diagram of a joined body 17A showing a state in which the first pipe member 11 and the second pipe member 13 are electromagnetically molded using a plurality of divided molding jigs 71A, 71B, 71C, and 71D.

The first pipe member 11 that is expanded by electromagnetic expansion of the second pipe member 13 is pressed against the pressing portions 71a of the plurality of (four as an example in the present configuration) molding jigs 71A, 71B, 71C, and 71D. Joining portions 15A, 15B, 15C, and 15D are formed at pressed positions, respectively. The through holes 19 formed in the first pipe member 11 are arranged at positions of the joining portions 15A, 15B, 15C, and 15D of the first pipe member 11, but are not limited thereto, and may be arranged at any position.

Figure 11:
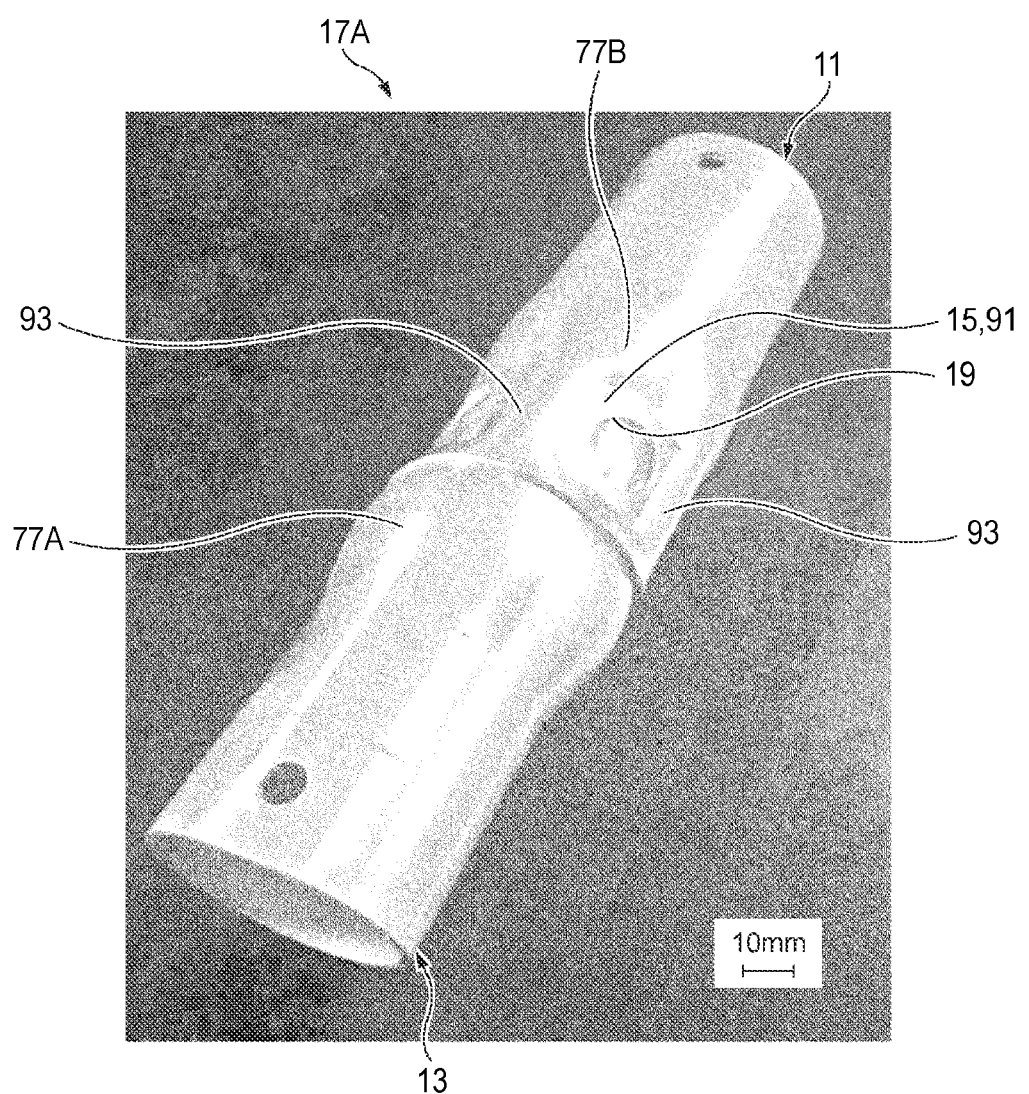
FIG. 11 is a perspective view showing an appearance of a joined body electromagnetically molded using the molding jigs shown in FIG. 10.

FIG. 11 is a perspective view showing an appearance of the joined body 17A electromagnetically molded using the molding jigs shown in FIG. 10.

Square indentations 91 pressed against the molding jigs are formed at four portions in total on the outer circumferential surface of the first pipe member 11, and inner regions of the indentations 91 are the joining portions 15A, 15B, 15C, and 15D shown in FIG. 10, respectively. The through hole 19 is formed inside each of the indentations 91, and the outer circumferential surface of the second pipe member 13 is exposed from the through holes 19.

The pair of annular bulging portions 77A and 77B are formed on both sides of the indentations 91, that is, the joining portions 15 (15A, 15B, 15C, and 15D) in the pipe axial direction, and bulging pleats 93 bulging radially outward are formed between the joining portions 15 along the circumferential direction. The bulging pleats 93 are formed at both the first pipe member 11 and the second pipe member 13. The inside of each indentation 91 is a flat portion.

Figure 12:
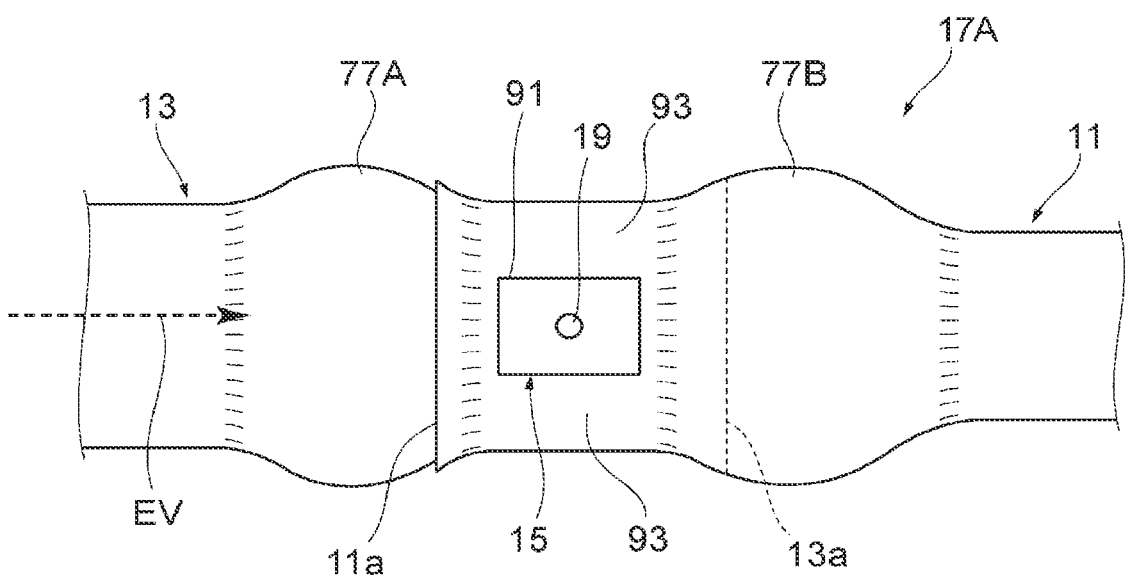
FIG. 12 is a schematic front diagram of the joined body.

FIG. 12 is a schematic front diagram of the joined body 17A.

In this case, when the elastic vibration wave of the second pipe member 13 indicated by the arrow EV is propagated toward the pipe end 13a, the elastic vibration wave is attenuated at the joining portion 15 in a state in which a good joining strength is obtained. Therefore, the vibration distribution of the second pipe member 13 exposed from the through holes 19 is detected by the above-described testing method for the joined body, and the joining state between the first pipe member 11 and the second pipe member 13 at the joining portion 15 is evaluated. In addition, since the region of the joining portion 15 is a flat portion, the vibration can be observed more easily than in the case of a cylindrical shape.

The entire region of the joining portion 15 is a region in which the first pipe member 11 and the second pipe member 13 are in close contact with each other, but the degree of close contact decreases depending on the swaging state of the first pipe member 11 and the second pipe member 13 at the edge portion of the joining portion 15, or the like. The decrease in the degree of close contact can be detected by the vibration distribution of the second pipe member 13 observed through the through hole 19 and the vibration distribution of the first pipe member 11.

Figure 13:
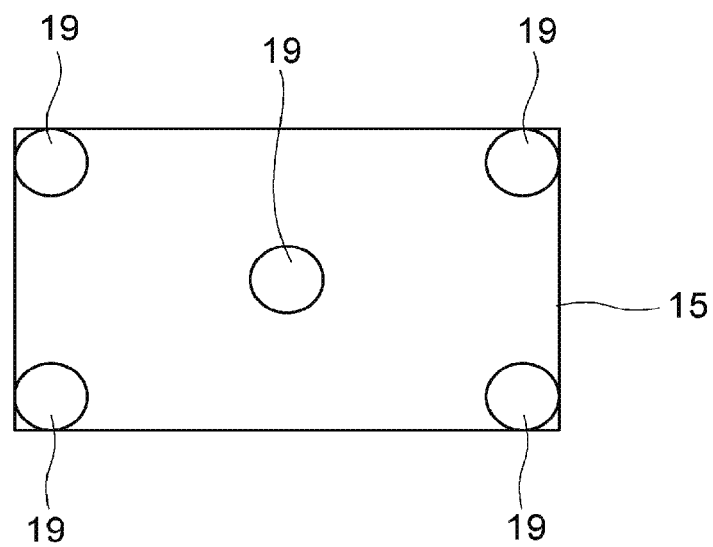
FIG. 13 is a diagram showing arrangement examples of through holes provided in the joining portion in (A) and (B).
Figure 13:
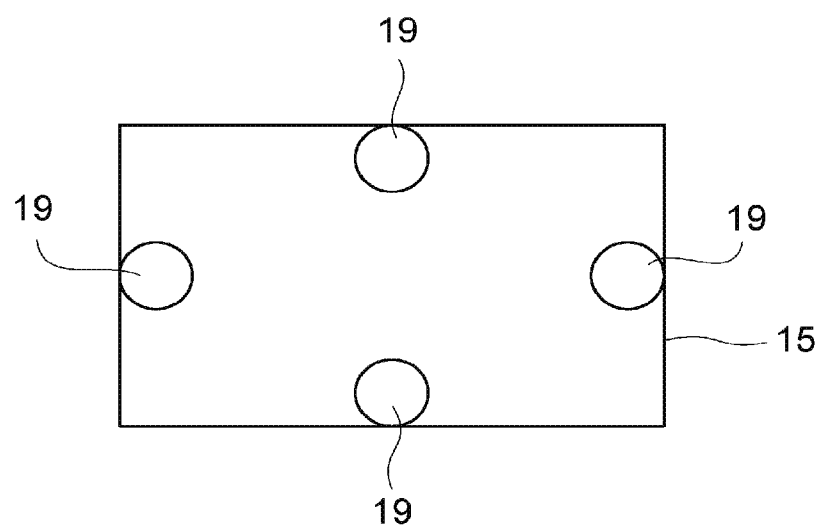

FIG. 13 is a diagram showing arrangement examples of the through holes 19 provided in the region of the joining portion 15 in (A) and (B).

The through holes 19 can be arranged at any position, but may be arranged, for example, in the vicinity of a portion where a swaging failure or the like is likely to occur. In this case, a swaging failure position can be specified by detecting the vibration distribution through the through holes 19. In particular, as shown in (A) of FIG. 13, the through holes 19 may be arranged at corner portions of the joining portion 15, and as shown in (B) of FIG. 13, the through holes 19 may be arranged at centers of sides of the joining portion 15.

In this way, the through holes 19 are preferably arranged in the vicinity of a portion where the joining state of the joining portion 15 is particularly desired to be evaluated in detail, and can be appropriately selected according to an evaluation purpose or the shape and size of the joining portion 15.

In this way, the present invention is not limited to the above embodiment, and combinations of the respective configurations of the embodiment, or changes and applications made by those skilled in the art based on the description of the specification and the well-known technology are also intended by the present invention and are included within the scope to be protected.

As a method for measuring the vibration distribution of the visual field region, a speckle method, a grating projection method, a sampling moire method, a digital image correlation method, or a laser Doppler method can be used in addition to the speckle sharing method described above. In the speckle sharing method, as described above, a reflected light irradiated from a light source to each point in a visual field region and reflected and a reference light reflected by an irradiation light at each point in the vicinity thereof are caused to interfere with each other, and a vibration distribution in the visual field region is obtained from an interference pattern thereof. In the speckle method, a reflected light irradiated from a light source to each point in a visual field region and reflected and a reference light branched from an irradiation light between the light source and the visual field region are caused to interfere with each other, and a vibration distribution in the visual field region is obtained from an interference pattern thereof. In addition, as a modification of the speckle sharing method, a reflected light irradiated from a light source to each point in a visual field region and reflected and a reference light reflected by an irradiation light at a large number of points in the region in the vicinity of each point may be caused to interfere with each other, and a vibration distribution in the visual field region may be obtained from an interference pattern thereof.

In addition, the measurement on the vibration distribution may be performed by performing strobe illumination other than the above-described pulse laser light on the visual field region. Even in this case, the displacement in the out-of-plane direction of each point in the visual field region is measured in at least three different phases of the vibration by controlling timings of elastic wave vibration and the strobe illumination. By this method, the vibration distribution in the visual field region can be easily obtained.

As described above, the following matters are disclosed in the present specification.

(1) A testing method for a joined body, in which a second pipe member having an outer diameter smaller than that of a first pipe member having at least one through hole is inserted into the first pipe member and the second pipe member is expanded to form a joining portion, the testing method including:

applying an elastic wave vibration to the joined body of the first pipe member and the second pipe member, for a plurality of visual field regions at different positions in a circumferential direction of the joined body, acquiring a vibration distribution of the second pipe member measured through the through hole and a vibration distribution of the first pipe member in a visual field region including the joining portion of the first pipe member and the second pipe member, which are measured optically and in a batch, and determining quality of joining in the entire joining portion based on the acquired vibration distributions.

According to the testing method for a joined body, even at the joining portion at which the first pipe member and the second pipe member which are overlapped with each other are joined to each other, the second pipe member which is overlapped with the first pipe member can be exposed by forming the through hole in the first pipe member, and the vibration distribution of the second pipe member can be detected through the through hole. Further, according to the detected vibration distributions of the first pipe member and the second pipe member, the degree of close contact between the first pipe member and the second pipe member at the joining portion can be evaluated with high accuracy.

(2) The testing method for a joined body according to (1), in which in each of the plurality of visual field regions, the vibration distribution is measured by applying, to the joined body, a plurality of types of the elastic wave vibrations in which one or both of a position and a frequency at which the elastic wave vibrations are applied at the joined body are different with one another, and when each of the measured plurality of types of the vibration distributions has a node of the vibration at the joining portion, it is determined that joining at the joining portion in the visual field region is good.

According to the testing method for a joined body, when the joining portion is well joined, the vibration usually becomes a node of a standing wave at the position of the joining portion regardless of the position or the frequency at which the vibration is applied to the joined body, and when each of the plurality of types of vibration distributions has the node of the vibration at the joining portion, it can be determined that the joining is good. Since presence or absence of the node of the vibration can be more easily identified than presence or absence of continuity of the vibration, the quality of the joining can be more easily determined. However, in the vibration distribution due to one type of vibration, a node of the standing wave may be accidentally present at the joining portion regardless of the quality of the joining, and thus the vibration distribution is obtained from each of the plurality of types of vibrations.

When a plurality of types of vibrations having different frequencies are applied to the joined body, the vibration distribution can be measured after the vibrations are applied to the joined body at different timings for each of the frequencies. Alternatively, the vibration distribution for each frequency may be obtained by applying vibration in which the plurality of frequencies are superimposed at a time and performing frequency analysis. The former is preferable from the viewpoint that data analysis is easier than the latter, and the latter is preferable from the viewpoint that a time required for measurement can be made shorter than the former.

(3) The testing method for a joined body according to (1) or (2), in which the measurement on the vibration distribution is performed by performing strobe illumination on the visual field region and measuring a displacement in an out-of-plane direction of each point in the visual field region in at least three different phases of the elastic wave vibration by controlling timings of the elastic wave vibration and the strobe illumination.

According to the testing method for a joined body, the vibration distribution in the visual field region can be easily obtained by measuring the displacement in the out-of-plane direction of each point in the visual field region in at least three different phases of the vibration.

(4) The testing method for a joined body according to any one of (1) to (3), in which
in the first pipe member, at least a periphery of the through hole is formed as a flat surface.

According to the testing method for a joined body, the vibration distribution can be easily detected as compared with a case of a curved surface.

(5) A testing device for a joined body, in which a second pipe member having an outer diameter smaller than that of a first pipe member is overlapped and joined in the first pipe member, the testing device including:
a vibration applying unit configured to apply an elastic wave vibration to the joined body, and
a vibration detection unit configured to acquire, for a plurality of visual field regions at different positions in a circumferential direction of the joined body, a vibration distribution of an exposed portion of the second pipe member measured through a through hole formed in the first pipe member and a vibration distribution of the first pipe member in a visual field region including a joining portion of the first pipe member and the second pipe member, which are measured optically and in a batch.

According to the testing device for a joined body, in the elastic wave vibration applied to the second pipe member from the vibration applying unit and propagated to the second pipe member and the first pipe member, both the vibration of the second pipe member observed through the through hole of the first pipe member and the vibration of the first pipe member are detected by the vibration detection unit, whereby information on the vibration distribution that cannot be obtained only from the surface of the first pipe member is obtained.

(6) The testing device for a joined body according to (5), further including:
an evaluation unit configured to obtain a degree of close contact between the first pipe member and the second pipe member at the joining portion in accordance with the detected vibration distribution of the exposed portion.

According to the testing device for a joined body, the joining state of the joined body can be evaluated by obtaining the degree of close contact from the vibration distribution.

(7) The testing device for a joined body according to (5) or (6), in which
the vibration detection unit includes:
a light irradiation unit configured to irradiate a visual field region including at least the through hole of the first pipe member with a laser light,
a light detection unit configured to detect an interference pattern formed by interference between a reference light and a reflected light obtained by reflecting the laser light in the visual field region, and
a vibration distribution determination unit configured to obtain the vibration distribution from the interference pattern.

According to the testing device for a joined body, the vibration distribution can be detected with high accuracy and in a batch from the interference pattern between the reference light and the reflected light obtained by irradiating the laser light.

(8) The testing device for a joined body according to (7), in which
a timing at which the vibration applying unit outputs the elastic wave vibration and a timing at which the light irradiation unit irradiates the visual field region with the laser light are changed, and
the vibration detection unit measures a displacement in an out-of-plane vibration direction of each point in the visual field region in at least three different phases of the elastic wave vibration, and obtains the vibration distribution.

According to the testing device for a joined body, the elastic wave vibration and the irradiation with the laser light are synchronized with each other, the elastic wave vibration of different phases is applied to the joined body, and the vibration distribution in the visual field region can be obtained by the relative displacement of the joined body due to the application of the elastic wave vibration.

(9) The testing device for a joined body according to (7) or (8), further including:
a relative movement mechanism configured to change an irradiation position of the laser light from the light irradiation unit by relatively moving the joined body and the light irradiation unit.

According to the testing device for a joined body, the vibration distribution at any position of the joined body can be detected by changing the irradiation position of the laser light.

(10) A joined body including a joining portion in which an inner circumferential surface of the first pipe member and an outer circumferential surface of the second pipe member are in close contact with each other in a state in which at least a part of a second pipe member having an outer diameter smaller than that of a first pipe member is inserted into the first pipe member and the first pipe member and the second pipe member are expanded, in which
at least one through hole is formed in the joining portion of the first pipe member, and
the joining portion of the second pipe member is in contact with the first pipe member without being engaged with an inner edge of the through hole.

According to the joined body, since the second pipe member is exposed from the through hole of the first pipe member, the vibration distribution of the first pipe member and the vibration distribution of the exposed portion of the second pipe member can be directly detected. Therefore, the degree of close contact of the joined body can be easily evaluated.

(11) The joined body according to (10), in which
the joining portion of the first pipe member has a flat portion at least at one portion in a circumferential direction.

According to the joined body, the vibration distribution can be easily detected as compared with a case of a curved surface.

(12) The joined body according to (10) or (11), in which
the joining portions are provided at a plurality of portions of the first pipe member and the second pipe member, and
the through hole is formed in each of the joining portions of the first pipe member.

According to the joined body, since the through hole is formed in each of the plurality of joining portions, the vibration distribution of the second pipe member at each of the joining portions can be individually detected.

The present application is based on Japanese Patent Application No. 2020-133198 filed on Aug. 5, 2020, and the contents thereof are incorporated herein by reference.

REFERENCE SIGNS LIST 11 first pipe member
13 second pipe member
15, 15A, 15B, 15C, 15D joining portion
17, 17A joined body
19 through hole
21 vibration applying unit
23 vibration detection unit
25 relative movement mechanism
27 evaluation unit
33 control unit
35 signal generator
37 vibrator
41 light irradiation unit
43 light detection unit
45 vibration distribution determination unit
47 laser light source
49 beam shaping lens
51 beam splitter
53 first reflecting mirror
55 second reflecting mirror
57 phase shifter
59 condensing lens
61 image sensor
63 speckle sharing interferometer
75 overlapping portion
85 bent portion
87 curved portion
91 indentation
100 testing device (testing device for joined body)

The invention claimed is:

1. A testing method for a joined body, in which a second pipe member having an outer diameter smaller than that of a first pipe member having at least one through hole is inserted into the first pipe member and the second pipe member is expanded to form a joining portion, the testing method comprising:
applying an elastic wave vibration to the joined body of the first pipe member and the second pipe member,
for a plurality of visual field regions at different positions in a circumferential direction of the joined body, acquiring a vibration distribution of the second pipe member measured through the through hole and a vibration distribution of the first pipe member in a visual field region including the joining portion of the first pipe member and the second pipe member, which are measured optically and in a batch, and
determining quality of joining in the entire joining portion based on the acquired vibration distributions.

2. The testing method for a joined body according to claim 1, wherein
in each of the plurality of visual field regions, the vibration distribution is measured by applying, to the joined body, a plurality of types of the elastic wave vibrations in which one or both of a position and a frequency at which the elastic wave vibrations are applied at the joined body are different with one another, and when each of the measured plurality of types of the vibration distributions has a node of a standing wave of a vibration at the joining portion, it is determined that joining at the joining portion in the visual field region in which the vibration distribution is measured is good.

3. The testing method for a joined body according to claim 2, wherein
the measurement on the vibration distribution is performed by performing strobe illumination on the visual field region and measuring a displacement in an out-of-plane direction of each point in the visual field region in at least three different phases of the elastic wave vibration by controlling timings of the elastic wave vibration and the strobe illumination.

4. The testing method for a joined body according to claim 2, wherein
in the first pipe member, at least a periphery of the through hole is formed as a flat surface.

5. The testing method for a joined body according to claim 1, wherein
the measurement on the vibration distribution is performed by performing strobe illumination on the visual field region and measuring a displacement in an out-of-plane direction of each point in the visual field region in at least three different phases of the elastic wave vibration by controlling timings of the elastic wave vibration and the strobe illumination.

6. The testing method for a joined body according to claim 5, wherein
in the first pipe member, at least a periphery of the through hole is formed as a flat surface.

7. The testing method for a joined body according to claim 1, wherein
in the first pipe member, at least a periphery of the through hole is formed as a flat surface.

8. A testing device for a joined body, in which a second pipe member having an outer diameter smaller than that of a first pipe member is overlapped and joined in the first pipe member, the testing device comprising:
a vibration applying unit configured to apply an elastic wave vibration to the joined body, and
a vibration detection unit configured to acquire, for a plurality of visual field regions at different positions in a circumferential direction of the joined body, a vibration distribution of an exposed portion of the second pipe member measured through a through hole formed in the first pipe member and a vibration distribution of the first pipe member in a visual field region including a joining portion of the first pipe member and the second pipe member, which are measured optically and in a batch.

9. The testing device for a joined body according to claim 8, further comprising:
an evaluation unit configured to obtain a degree of close contact between the first pipe member and the second pipe member at the joining portion in accordance with the detected vibration distribution of the exposed portion.

10. The testing device for a joined body according to claim 9, wherein
the vibration detection unit comprises:
a light irradiation unit configured to irradiate a visual field region including at least the through hole of the first pipe member with a laser light,
a light detection unit configured to detect an interference pattern formed by interference between a reference light and a reflected light obtained by reflecting the laser light in the visual field region, and
a vibration distribution determination unit configured to obtain the vibration distribution from the interference pattern.

11. The testing device for a joined body according to claim 10, wherein
  a timing at which the vibration applying unit outputs the elastic wave vibration and a timing at which the light irradiation unit irradiates the visual field region with the laser light are changed, and
  the vibration detection unit measures a displacement in an out-of-plane vibration direction of each point in the visual field region in at least three different phases of the elastic wave vibration, and obtains the vibration distribution.

12. The testing device for a joined body according to claim 10, further comprising:
  a relative movement mechanism configured to change an irradiation position of the laser light from the light irradiation unit by relatively moving the joined body and the light irradiation unit.

13. The testing device for a joined body according to claim 8, wherein
  the vibration detection unit comprises:
    a light irradiation unit configured to irradiate a visual field region including at least the through hole of the first pipe member with a laser light,
    a light detection unit configured to detect an interference pattern formed by interference between a reference light and a reflected light obtained by reflecting the laser light in the visual field region, and
    a vibration distribution determination unit configured to obtain the vibration distribution from the interference pattern.

14. The testing device for a joined body according to claim 13, wherein
  a timing at which the vibration applying unit outputs the elastic wave vibration and a timing at which the light irradiation unit irradiates the visual field region with the laser light are changed, and
  the vibration detection unit measures a displacement in an out-of-plane vibration direction of each point in the visual field region in at least three different phases of the elastic wave vibration, and obtains the vibration distribution.

15. The testing device for a joined body according to claim 14, further comprising:
  a relative movement mechanism configured to change an irradiation position of the laser light from the light irradiation unit by relatively moving the joined body and the light irradiation unit.

16. The testing device for a joined body according to claim 13, further comprising:
  a relative movement mechanism configured to change an irradiation position of the laser light from the light irradiation unit by relatively moving the joined body and the light irradiation unit.

* * * * *